March 26, 1968     E. J. SAMALON     3,374,892
FILTER ASSEMBLY HAVING FILTERED BYPASS FLOW
Filed Jan. 17, 1966     2 Sheets-Sheet 1
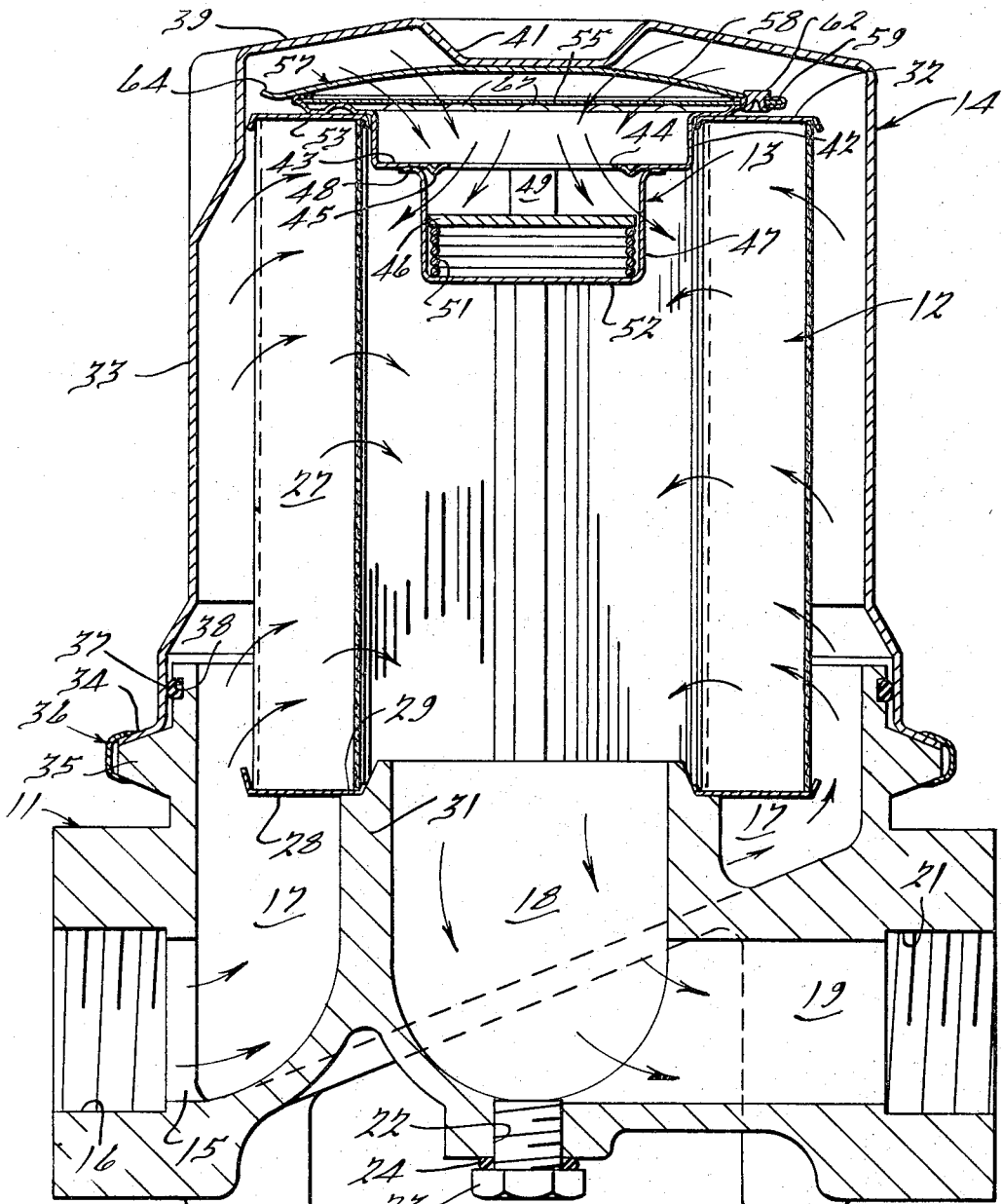
INVENTOR.
Eugene J. Samalon
BY
Harness, Dickey & Pierce
ATTORNEYS.

March 26, 1968   E. J. SAMALON   3,374,892
FILTER ASSEMBLY HAVING FILTERED BYPASS FLOW
Filed Jan. 17, 1966   2 Sheets-Sheet 2
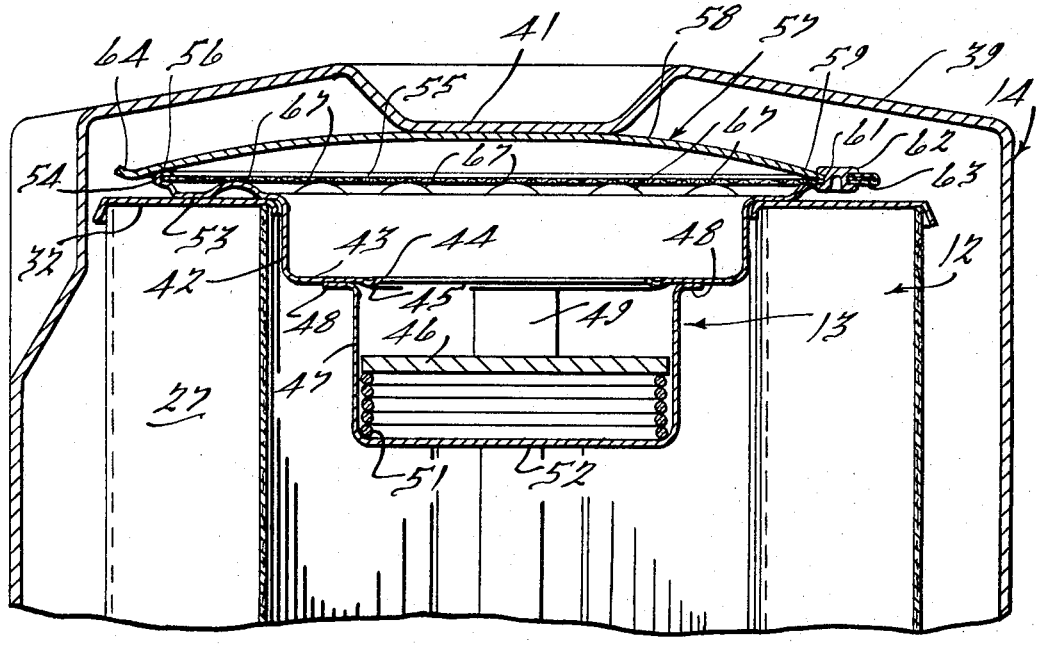
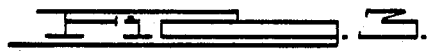
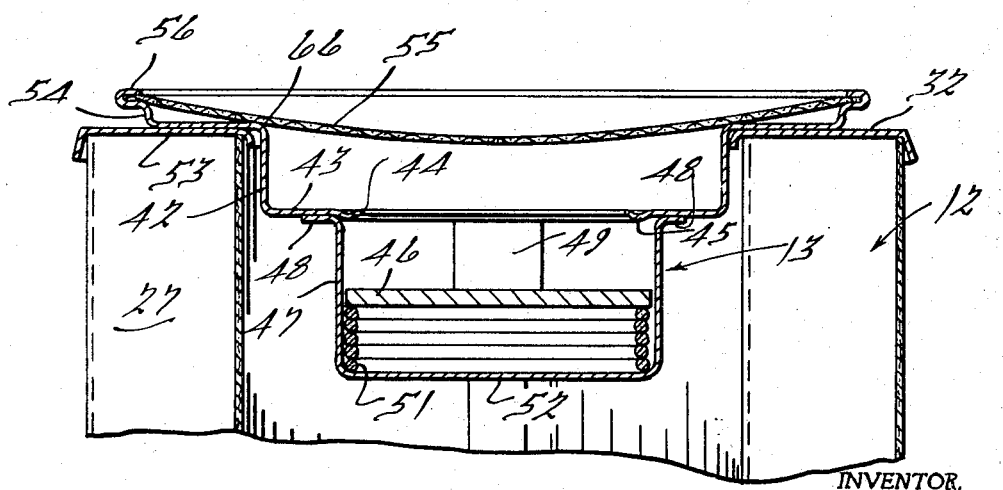
INVENTOR.
Eugene J. Samalon
BY
Harness, Dickey & Pierce
ATTORNEYS.

United States Patent Office 3,374,892
Patented Mar. 26, 1968

3,374,892
FILTER ASSEMBLY HAVING FILTERED
BYPASS FLOW
Eugene J. Samalon, Racine, Wis., assignor to Walker
Manufacturing Company, a corporation of Delaware
Filed Jan. 17, 1966, Ser. No. 521,020
4 Claims. (Cl. 210—132)

ABSTRACT OF THE DISCLOSURE

A filter assembly embodying a bypass valve assembly that incorporates a relatively coarse screen for removing large particles from the fluid when the main filter element is being bypassed. The bypass valve assembly is supported within one end of the central flow passage of an annular filter element and incorporates a leaf type spring for maintaining a seal between certain elements of the assembly.

---

This invention relates to a fluid filter and more particularly to an improved bypass valve and hold-down spring for a fluid filter.

The use of bypass valves in fluid filters for bypassing fluid flow past the filter media when it becomes clogged is well known. Although the filter media should be replaced when it becomes clogged to the extent that the bypass valves open, frequently the filters remain in service for a longer period of time. Unless some form of filtering is provided across the bypass passage, unfiltered fluid will reach the system.

It is, therefore, an object of this invention to provide a secondary, coarser filter across the mouth of a bypass valve.

A fine mesh screen is effective in an application of the aformentioned type of filtering bypass flow. The screen should, however, present a relatively large flow area so that it will not become clogged when bypass flow occurs. If a large screen is used, however, the fluid pressure on the screen may cause it to deform or collapse. The deformation may have the tendency of reducing the flow area through the screen since the screen may contact a more rigid member when deformed.

It is, therefore, a further object of this invention to provide an improved support for a bypass screen for a fluid filter.

A bypass valve for a fluid filter embodying this invention is comprised of a housing defining a fluid inlet passage and a reticulated member supported around its periphery and extending across the inlet passage. The reticulated member filters the bypass flow. A plurality of relatively rigid support members are positioned on the downstream side of the reticulated member for engaging the reticulated member and limiting its deformation under fluid pressure. The support members present a relatively low area of contact with the reticulated member for minimum flow area loss upon contact therebetween.

Most fluid filter systems embody some form of hold-down spring for maintaining at least one end of the filter against a seat to provide a seal. Many types of hold-down springs such as Belleville springs and coil springs have been employed for this purpose. These springs, however, are relatively expensive and have not been fully satisfactory in all applications.

It is, therefore, a further object of this invention to provide an improved, low cost hold-down spring for a fluid filter.

A fluid filter hold-down spring embodying this invention is comprised of a narrow strip of resilient material. The strip is of arcuate shape and has respective end portions, one of which is adapted to be staked to the filter. The other of the end portions is adapted to slidingly engage the filter for flattening of the spring upon compression loading of the arcuate portion.

Other objects and advantages of this invention will become more apparent as this description proceeds, particularly when considered in conjunction with the accompanying drawings, wherein:

FIGURE 1 is a longitudinal cross section taken through a fluid filter embodying this invention;

FIGURE 2 is a top plan view, on reduced scale, of the bypass valve shown in FIGURE 1, with a portion broken away;

FIGURE 3 is an enlarged cross-sectional view of the bypass valve shown in FIGURE 1; and FIGURE 4 is a cross-sectional view, in part similar to FIGURE 3, showing a prior art type of bypass valve.

Referring now in detail to the drawings, FIGURE 1 shows a fluid filter embodying this invention and comprised of a base 11, filter cartridge 12, bypass valve 13 and housing 14. The base 11 is formed with a fluid inlet passage 15 that terminates at its outer end in a tapped opening 16 to which any fluid supply line may be connected. The fluid inlet passage 15 opens into an annular fluid inlet cavity 17. Formed centrally of the fluid inlet cavity 17 is a fluid outlet cavity 18 that is intersected at its lower end by a fluid outlet passage 19. A tapped opening 21 is formed at the outer end of the fluid outlet passage 19 for connection to any suitable fitting of a fluid line. A hole 22 is drilled and tapped into the base 11 below the fluid outlet cavity 18 for drainage of sediments therefrom. A bolt 23, and O-ring seal 24 close the passage 22.

The filter cartridge 12 has an annular shape and is comprised of any suitable filter media 27, for example, pleated paper. It is to be understood, however, that ram-packed cotton, randomly disposed fibers or other media may be used with this invention. The lower end of the pleated filter media 27 is sealed by means of a resilient end cap 28 that is affixed to the media 27. The end cap 28 sealingly engages a shoulder 29 formed in a cylindrical projection 31 that divides the fluid inlet and outlet cavities 17 and 18 of the base 11. The bypass valve assembly 13 and an upper resilient end cap 32 close the upper end of the central passage of the annular filter cartridge 12 as will become more apparent as this description proceeds.

The housing 14 is formed from sheet metal and has a generally cylindrical side wall 33 with an outwardly flared portion 34 formed at its lower end. The flared portion 34 engages an annular shoulder 35 formed on the base 11 and is held in engagement therewith by means of a clamp, indicated generally by the reference numeral 36. A seal 37 is contained within an annular groove 38 forced in the base 11 above the shoulder 35. The seal 37 engages the housing 14 and precludes any leakage of fluid from the housing past the base 11. The upper end of the housing 14 is closed by an integral end wall 39 with a depressed central portion 41.

Referring now in detail to FIGURES 2 and 4 in addition to FIGURE 1, the bypass valve 13 is comprised of a housing formed from sheet metal and having a cylindrical portion 42 that extends into the central passage of the filter cartridge 12 radially inwardly of the pleated filter media 27. The lower end of the housing portion 42 is formed with a generally radially extending flange 43 that defines a central opening 44 which may be considered a fluid bypass inlet opening. A downwardly extending ridge 45 is formed in the flange 43 adjacent the opening 44. A valve disk 46 is supported within a valve cage 47 that has outturned tabs 48 that are affixed, as by spot welding, to the housing flange. 43. A plurality of axially extending openings 49 are formed in the valve cage 47, which openings function as by pass fluid outlet openings.

A coil spring 51 is contained within the valve cage 47 and is loaded between the valve disk 46 and an integral horizontally extending lower wall 52 of the valve cage 47.

The upper end of the cylindrical housing portion 42 has a radially outwardly extending cylindrical flange 53 formed with an upstanding portion 54. A wire screen 55 of generally disk shape is affixed to the upstanding portion 54, as by a rolled-over seam 56. Thus, the screen 55 is retained across the opening of the bypass valve assembly 13.

A hold-down spring in the form of a thin strip of resilient metal such as spring steel is indicated generally by the reference numeral 57. The hold-down spring 57 has a generally arcuate shaped intermediate portion 58 and an end portion 59 in which an aperture 61 is formed. A rivet 62 extends through the aperture 61 and through a corresponding aperture in a flattened portion 63 of the housing flange 53 so that the respective end of the hold-down spring will be staked to the bypass valve assembly 13 and particularly to its housing. The opposite end 64 of the spring 57 engages and extends across the side of the rolled-over flange 56 diametrically opposite to the rivet 62.

The filter cartridge 12 and bypass valve assembly 13, including the hold-down spring 57 may comprise a single assembly with the bypass valve 13 being suitably affixed to the filter cartridge 12. It is to be understood, however, that these parts may be separate. When the filter cartridge 12 and bypass valve assembly 13 are positioned upon the base 11 and the housing 14 held in place by the clamp 36, the housing central portion 41 will engage the arcuate portion 58 of the spring 57. This will exert a resilient sealing pressure upon the filter end cap 28 against the housing shoulder 29 to effect a fluid seal. The spring 57 will flatten under this loading to maintain the sealing pressure. Flattening of the spring 57 is permitted since the end 64 merely slides across the opposite end of the bypass valve housing.

As is well known, fluid that has entered the housing 14 through base 11 will pass radially through the filter cartridge 12 from the fluid inlet cavity 17 to the fluid outlet cavity 18. The normally closed bypass valve assembly 13 will preclude any flow past the upper end of the filter cartridge 12. When the pleated paper 27 becomes clogged with contaminants, however, the pressure upon the valve disk 46 will exceed the preload of the coil spring 51 and the bypass valve assembly 13 will open, as shown in the drawings. The fluid will then pass through the fine mesh screen 55 and bypass valve fluid outlet openings 49. The screen 55 will accomplish some, albeit coarse, filtering of the fluid.

It is desirable to maintain a maximum area for the bypass screen 55, and for this reason, the screen 55 has a larger cross-sectional area than the bypass inlet passage 44. The reason for a large screen is to insure that it will not become rapidly clogged with contaminants when bypass flow occurs. The use of such a large screen, however, increases its tendency to bow under pressure, as seen in FIGURE 4. In FIGURE 4, the deflected screen 55 has moved into engagement with a shoulder 66 formed at the juncture between the bypass valve housing portions 42 and 53. Thus, the effective area of the screen 55 will be considerably decreased increasing its likelihood of clogging.

Deflection of the screen 55 is precluded in the depicted embodiment by means of a plurality of spaced support members indicated generally by the reference numeral 67. The support members 67 are integral upset projections that are formed in the housing flange 53 adjacent the cylindrical portion 42. The projections 67 are generally spherical in external shape and are contacted by the screen 55 when it tends to deflect under fluid pressure. Thus, the projections 67 preclude further deflection of the screen 55 and prevent it from engaging the shoulder 66 formed around the upper end of the cylindrical portion 42. They also have minimum contact area so as to provide a minimum flow reduction area through the screen 55.

While it will be apparent that the preferred embodiments of the invention disclosed are well calculated to fulfill the objects above stated, it will be appreciated that the invention is susceptible to modification variation and change without departing from the proper scope or fair meaning of the subjoined claims.

What is claimed is:

1. A filter assembly comprising a filter housing defining a generally cylindrical filtering chamber closed at at least one end by an end wall, means defining a fluid inlet passage for said filter housing in communication with said filtering cavity, means defining a fluid outlet passage in said filter housing in communcation with said filtering cavity, an annular filter element defining a central flow passage, one end of said filter element being in sealing engagement with said filter housing with one end of said central flow passage being in fluid registry with said fluid outlet passage for radial fluid flow through said filter element from said fluid inlet passage to said fluid outlet passage, a bypass valve assembly having a first portion supportingly engaged with the other end of said filter element and having a second portion depending into the other end of said central flow passage of said filter element, pressure responsive valve means supported in said second portion for bypassing fluid flow from said fluid inlet passage to said fluid outlet passage past said filter element when the flow resistance of said filter element exceeds a predetermined value, a disk shaped screen affixed to said first portion of said bypass valve assembly, said screen having a larger diameter than the diameter of said central flow passage and being positioned to filter the bypass fluid flowing through said bypass valve assembly, and leaf spring means affixed at one of its ends to said first portion of said bypass valve assembly, an intermediate portion of said leaf spring being engaged by said end wall of said filter housing, the other end of said leaf spring bearing against said first portion of said bypass valve assembly for maintaining said bypass valve assembly in assembled relationship to said filter element and for maintaining a sealing pressure between said one end of said filter element and said filter housing.

2. A filter assembly as set forth in claim 1 wherein the second portion of the bypass valve assembly comprises a first cylindrical portion, a first flange extending radially outwardly from one end of said first cylindrical portion and a second cylindrical portion extending from one of its ends from the outer edge of said first flange, said first cylindrical portion defining a fluid outlet passage for said bypass valve assembly and a fluid passage surrounded by a valve seat that is engaged by the pressure responsive valve means, the first portion of said bypass valve assembly comprising a second flange extending radially outwardly from the other end of said second cylindrical portion, the disk shaped screen being affixed to said second flange by a folded over portion of the outer periphery of said second flange.

3. A bypass valve assembly for a fluid filter comprising a housing having a first cylindrical portion defining a fluid outlet passage for said assembly, means defining a fluid opening surrounded by a valve seat at one end of said first cylindrical portion, a first flange extending radially outwardly from said one end of said first cylindrical portion, a second cylindrical portion extending at one of its ends from the outer edge of said first flange, said second cylindrical portion being of larger diameter than said first cylindrical portion, a second flange extending radially outwardly from the other end of said second cylindrical portion and upstanding spaced support members formed integrally in said second flange, the outer periphery of said second flange forming a fluid inlet passage for said assembly, a disk shaped screen, said outer periphery of said second flange being folded over and engaging the outer periphery of said screen for fixing said screen to said housing across said fluid inlet passage for filtering large foreign particles from fluid flowing from said fluid inlet passage to said fluid outlet passage, said screen being adapted to engage said support members across a relatively low area of contact under the application of fluid pressure for support of said screen by said support members, and pressure responsive valve means in said first cylindrical portion for cooperation with said valve seat for controlling the flow through said fluid opening and the flow from said inlet passage to said fluid outlet passage.

4. A bypass valve assembly as set forth in claim 3 further including leaf spring means having a first end affixed to the second flange of the bypass valve housing, an intermediate curved portion extending across the screen and having its second end portion engaging said second flange on a side diametrically opposite to said first end.

References Cited

UNITED STATES PATENTS

| | | |
|---|---|---|
| 420,136 | 1/1890 | Willis _____ 210—323 |
| 966,963 | 8/1910 | Steinkoenig _____ 210—455 X |
| 2,884,133 | 4/1959 | Walulik et al. _____ 210—136 |
| 3,056,501 | 10/1962 | Thorman et al. _____ 210—132 |
| 3,085,689 | 4/1963 | Hering et al. _____ 210—445 X |

FOREIGN PATENTS 675,436  12/1963  Canada.

REUBEN FRIEDMAN, *Primary Examiner.*

F. SPEAR, *Examiner.*